United States Patent [19]

Elliott et al.

[11] Patent Number: 5,490,271
[45] Date of Patent: Feb. 6, 1996

[54] REMOTE INTERRUPT PROCESSING OVER A NETWORK

[75] Inventors: Linda C. Elliott; Lloyd E. Jordan, II, both of Austin; Howard C. Nudd, Round Rock, all of Tex.

[73] Assignee: International Business Machines Corporation, Armonk, N.Y.

[21] Appl. No.: 72,361

[22] Filed: Jun. 4, 1993

Related U.S. Application Data

[63] Continuation of Ser. No. 870,168, Apr. 16, 1992, abandoned, which is a continuation of Ser. No. 352,076, May 15, 1989, abandoned.

[51] Int. Cl.⁶ .................................................. G06F 15/163
[52] U.S. Cl. .............. 395/650; 395/200.03; 364/DIG. 1; 364/280.8; 364/281.3
[58] Field of Search ...................................... 395/200, 650

[56] References Cited

U.S. PATENT DOCUMENTS

| | | | |
|---|---|---|---|
| 3,312,951 | 4/1967 | Hertz | 364/200 |
| 3,976,979 | 8/1976 | Parkinson et al. | 364/200 |
| 4,420,806 | 12/1983 | Johnson, Jr. et al. | 364/200 |
| 4,429,382 | 1/1984 | Greenstein et al. | 370/80 |
| 4,530,051 | 7/1985 | Johnson et al. | 364/200 |
| 4,819,159 | 4/1989 | Shipley et al. | 364/200 |
| 4,835,685 | 5/1989 | Kun | 364/200 |
| 4,887,204 | 12/1989 | Johnson et al. | 364/200 |
| 4,893,231 | 1/1990 | Bell | 364/200 |
| 4,943,913 | 7/1990 | Clark | 364/200 |
| 4,980,820 | 12/1990 | Youngbloob | 395/725 |
| 5,062,040 | 10/1991 | Bishop et al. | 395/650 |
| 5,109,515 | 4/1992 | Laggis et al. | 395/725 |

FOREIGN PATENT DOCUMENTS

0295424A2  12/1988  European Pat. Off. ........ G06F 11/14

OTHER PUBLICATIONS

Informationstechnik It. vol. 29 No. 3, 1987, W. Effelsberg "Datenbankzugriff in Rechnernetzen".

1987 Conference Proceedings, Conference Center Scottsdale Az. J. A. Davis "Integrating Communication and Database Services Using Intelligent Internetwork Gateways".

16th International Symposium On Fault Tolerant Computing Systems, Jul. 1986 "Backward error recovery in a UNIX environment" D. J. Taylor.

5th International Conference On Very Large Databases Oct. 1979, A. Reuter "Minimizing The I/O Operations For Undo–Logging In Database System".

*Primary Examiner*—Thomas G. Black
*Assistant Examiner*—John C. Loomis
*Attorney, Agent, or Firm*—Robert M. Carwell; Kenneth C. Hill; Andrew J. Dillon

[57] ABSTRACT

A local application connected to a remote application over a computer network can interrupt processing of the remote application. To do so, a new communications link is opened, and an identifier of the remote process to be interrupted is passed to the remote node. The new communications link is then closed. A manager process on the remote node raises the interrupt to the desired remote application, which returns acknowledgement of the interrupt over the original connection.

13 Claims, 3 Drawing Sheets

REMOTE INTERRUPT PROCESSING OVER A NETWORK

CROSS REFERENCE TO RELATED APPLICATION

This is a continuation of application Ser. No. 07/870,168, filed Apr. 16, 1992, abandoned, which is a continuation of application Ser. No. 07/352,076, filed May 15, 1989, abandoned. The present application contains subject matter related to application Ser. No. 07/352,082, now U.S. Pat. No. 5,179,660 entitled REMOTE APPLICATION INTERFACE, filed on even date herewith and assigned to the assignee hereof, and which is incorporated by reference herein.

BACKGROUND OF THE INVENTION

1. Technical Field

The present invention relates generally to digital computer systems, and more specifically to signalling between processes running on computer systems attached to a network.

2. Background Art

As small computers continue to become more powerful, and their costs decrease, networks of computers continue to be more common. These networks can be connected using a variety of network architectures, and typically consist of a moderate to large number of nodes. Each node can be a stand alone computer system, or a network shared resource such as a file server or printer.

Distributed processing over a network has a number of advantages over the use of a centralized mainframe which contributes to continuing growth in this area. A well designed network can expand as desired, adding work stations, terminals, and shared network resources as needed. A network is somewhat less sensitive to hardware failures, in that a hardware failure generally does not render the entire network useless, while preventative maintenance or a hardware failure in a centralized mainframe usually makes all resources completely unavailable. Work stations and dedicated servers connected to a network can be optimized for use in performing one or a limited number of functions, which improves efficiency.

An example of a type of system which can be beneficially attached to a network is a database server. Remote database accesses are made to the database server node from other nodes attached to the network. The database server can be optimized for efficient database access, while remaining available to a large number of users.

With distributed systems, user control of the machine actually performing a user's work is lessened. In fact, a user often does not know, or care, exactly which machine is performing work for that user. System and network loads, hardware failures, and other problems may cause long delays for a user without that user being aware of the source of the problem. In the case of remote database accesses, a user can also enter complex commands, perhaps accidentally, which create long delays before results are obtained.

If a long delay in receiving results from a remote network node is unexpected or undesired, it may be necessary for the user to interrupt processing on the remote node. In the case of remote shared database systems, as well as many other types of applications, the remote interrupt must be "graceful." In other words, the remote application must be able to handle the remote interrupt request in a predictable, completely determined manner, and leave all files on the remote node in a known, safe state. It is very important that shared databases handle interrupt requests gracefully, as corruption of data can result if they do not.

Therefore, if the user wishes to interrupt a request to a remote database and perform other work on his local node, he cannot simply cancel the application running on the remote node. Also, simply severing the communications link between the user's node and a remote database server is not a graceful way of interrupting a remote database request. It is also often not desired, as the user may want to make additional requests after the currently pending request is cancelled.

It would therefore desirable to provide a system and method for gracefully interrupting a process on a remote node of a computer network.

SUMMARY OF THE INVENTION

It is therefore an object of the present invention to provide a system and method for signalling to a process which is executing on a remote network node.

It is another object of the present invention to provide such a system and method wherein the signal to the remote node indicates an interrupt request.

It is a further object of the present invention to provide such a system wherein, upon receipt of an interrupt request signal, the remote process is interrupted gracefully.

Therefore, a system and method according to the present invention provides for signalling of an interrupt request or other signal to a process executing on a remote network node. An interrupt request is generated on a local node, and a new communications session is established between the local node and the remote node. The interrupt request is passed to the remote node over the new communications session, which is then terminated. An interrupt request is then raised at the remote node, which can respond to the request at its convenience.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
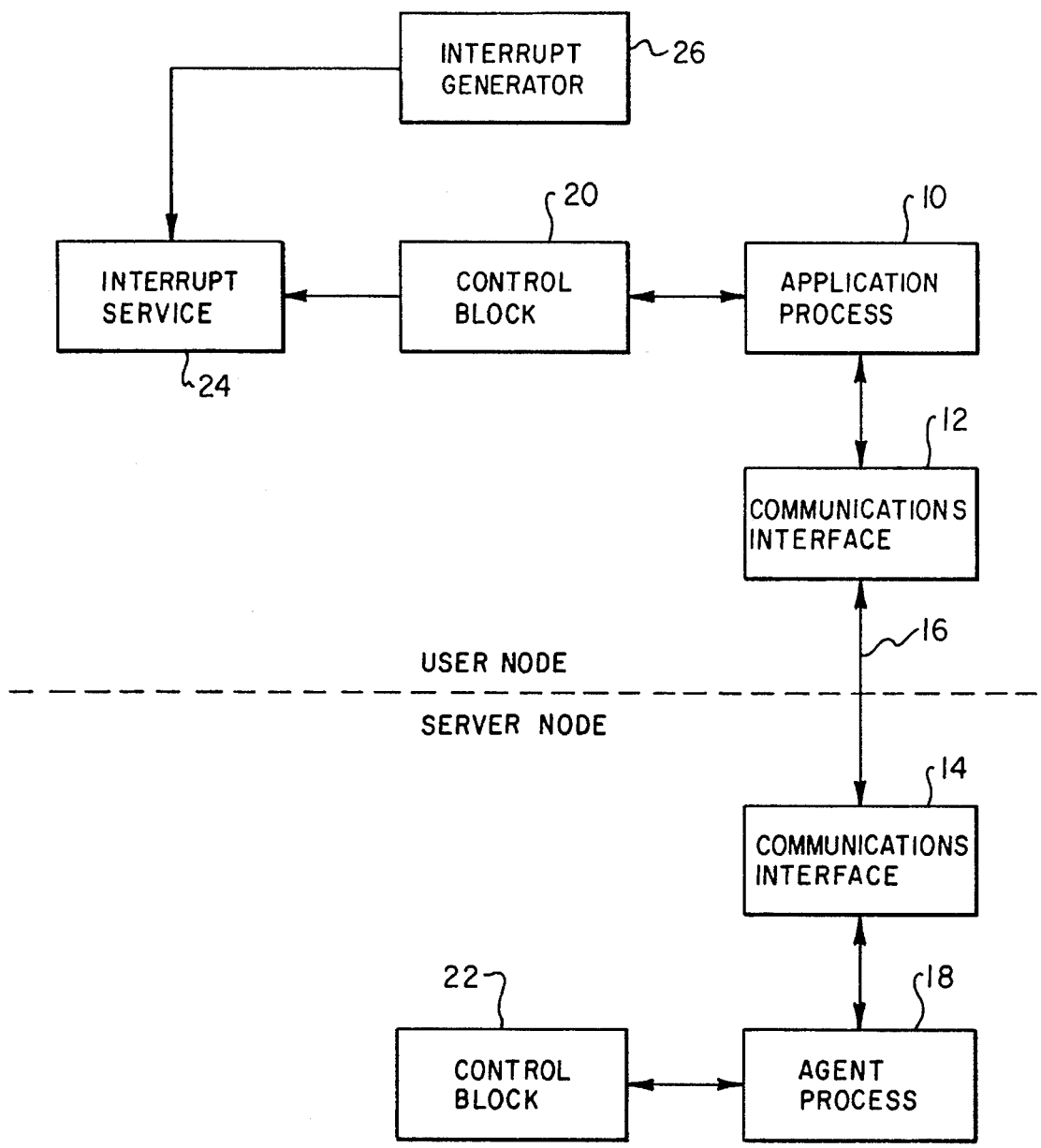
FIG. 1 is a block diagram illustrating execution of a remote process over a network.
Figure 2:
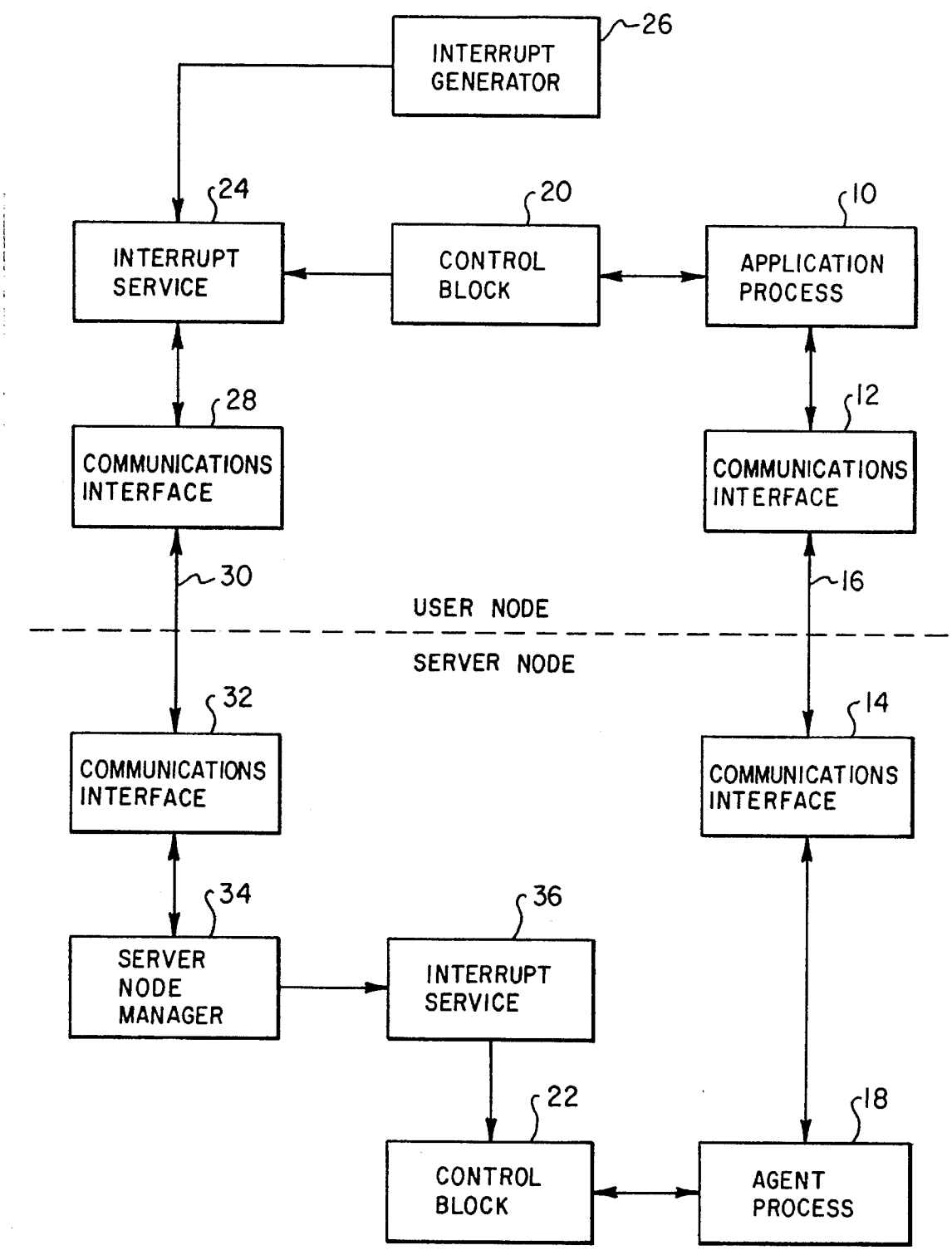
FIG. 2 is a block diagram illustrating interrupt signalling to the remote process.
Figure 3:
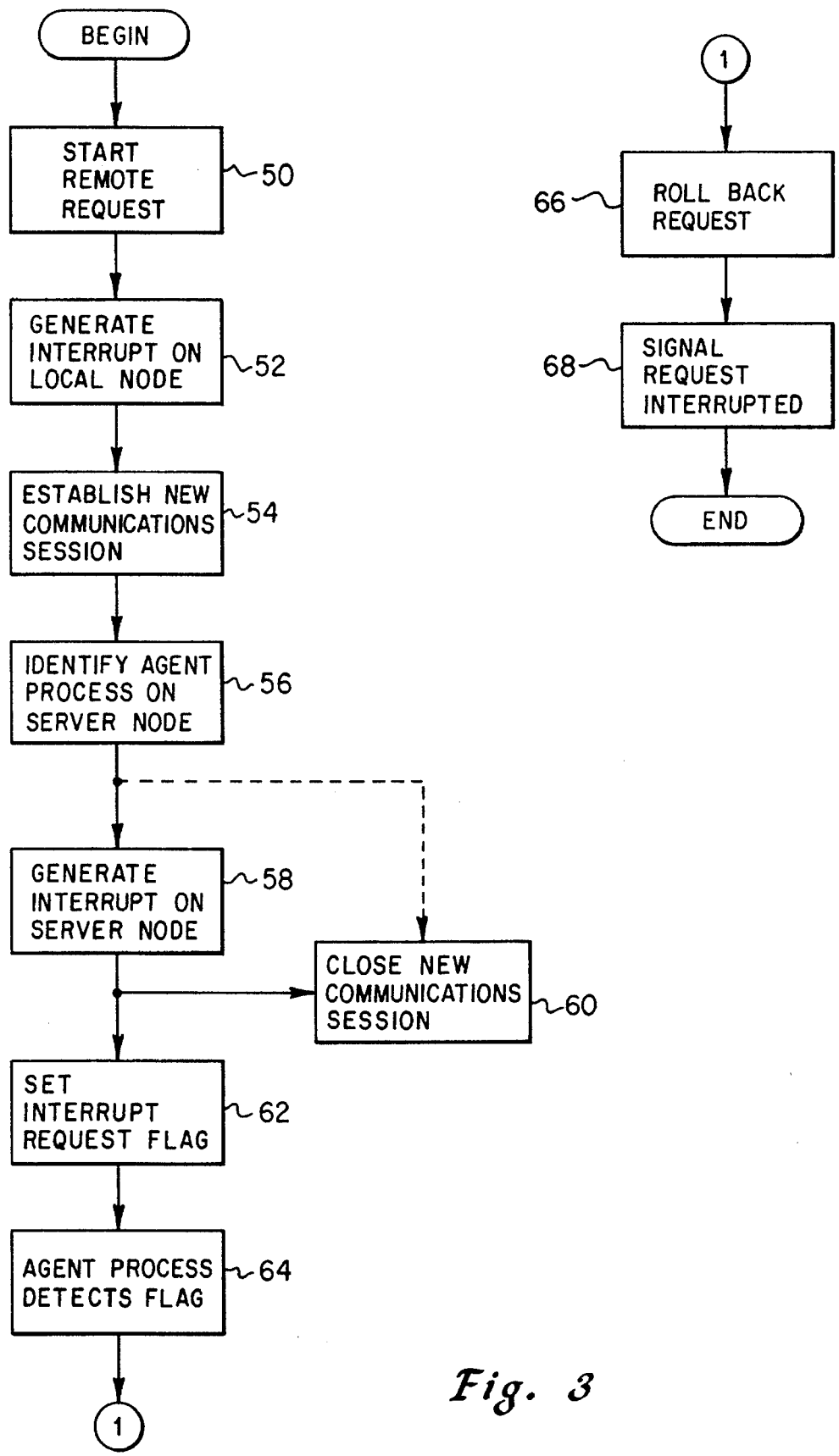
FIG. 3 is a flowchart illustrating a method for interrupting a process on a remote network node.

For purposes of describing the preferred embodiment, FIGS. 1–3 describe a local user application accessing a database on a remote server node. However, it will be understood by those skilled in the art that the principles illustrated herein may be used with remote applications other than remote database access.

A user application process 10 executing on a local, user node communicates with a communications interface 12. The communications interface 12 is connected to a communications interface 14 on a server node by a network communications link 16. The server communications interface 14 is in communication with an agent process 18 executing on the server node. For purposes of the illustration described herein, the agent process 18 is assumed to be a database manager accessing one or more databases available at the server node.

The nature of the communications link 16 depends on the properties of the network used to connect the server node to the user node. The network itself does not form a part of the present invention. For purposes of this description, it is only important that information can be transmitted between the server node and the user node.

The application process 10 has access to a data structure known as a control block 20. The control block 20 contains information relevant to the execution of the application process 10. For the purposes of the present invention, the control block 20 includes at least (1) a unique process identifier of the agent process 18 executing on the server node; and (2) whatever communications information is necessary to enable establishment of a communications session with the server node.

The agent process 18 also has access to a control block 22 which contains information relevant to execution of the agent process 18. For the purposes of the present invention, the control block 22 contains at least a flag for indicating that an interrupt has been requested. As will be described below, the agent process 18 periodically polls the interrupt request flag and the control block 22 in order to determine when an interrupt request is pending.

Another process which runs on the user node is an interrupt service process 24. Preferably, the interrupt service 24 executes only when an interrupt has been signalled by an interrupt generator 26. The interrupt generator 26 includes several possible sources for generating interrupts. An interrupt may be generated by the user typing CONTROL-BREAK, or another predefined key sequence, at a keyboard. Interrupts may also be generated by timeout routines, hardware error detection routines, or other processes concurrently executing on the user node. The precise source of the interrupt is not important; it is only important that the interrupt generator 26 generate a signal which indicates that it is desired that the agent process 18 interrupt what it currently doing.

FIG. 2 illustrates what happens when the interrupt generator 26 signals to the interrupt service 24 that the execution of the agent process 18 should be interrupted. The interrupt service 24 accesses the application control block 20, and extracts the information necessary to establish a communications session with the server node. Through communications interface 28, the interrupt service 24 establishes a network link 30 with server node communications interface 32. A server node manager 34 process either executes continuously looking for incoming communications, or is awakened when an incoming communication is received by the communications interface 32. The interrupt service 24 sends the unique process identifier of the agent process 18 to the server node manager 34 after the link 30 is established. When the server node manager 34 has received the agent process 18 unique identifier, the communications link 30 is closed by either the server node manager 34 or the interrupt service 24 according to the appropriate network protocol.

The server node manager 34 causes a server node interrupt server 36 to execute. The interrupt service 36 raises an interrupt request flag in the control block 22 to signal that an interrupt request is pending. If the server node is operating under the operating system OS/2, available from IBM, the server node manager 34 can use a DOSFLAGPROCESS operation to flag the agent process 18. This invokes a predetermined function in the agent process 18 which handles the interrupt as if it were interrupting a locally-running application by invoking the interrupt service 36.

The agent process 18, during execution, periodically polls the interrupt request flag and the control block 22. When a raised interrupt request flag is detected, the module within the agent process 18 which detects the flag stops execution and returns a special return code to its caller. This return code, indicating that an interrupt has been received, continues to be passed upward as the agent process 18 backs out of the procedure stack. When the interrupt request signal reaches a controlling module, the interrupt can be processed in a graceful way. A return code is preferably transmitted to the application process 10 on the network link 16 which indicates that the currently executing request was interrupted.

In the case where the agent process 18 is a database manager, it is generally the case that the pending transaction or subtransaction must be "rolled back" to a previous savepoint. This has the effect of undoing all changes to the database which have been made during the currently executing request. This restores the database to the same state it had before the interrupted request began execution. This is done gracefully without interrupting the previously established network link 16.

FIG. 3 is a flowchart illustrating interrupt of a remotely executing process on a network. A remote request is started 50 on the server node. When the agent process 18 is a database manager running SQL, each request can be a single SQL statement, or a series of statements. The user application process then waits for a result to be returned from the server node.

If it becomes necessary or desired, an interrupt is generated on the local node 52. The interrupt can be required for example, due to excessive delay in completing the remote request, or a requirement that resources at the user node be rededicated to a new task. When the interrupt has been generated, a new communications session is established between the user node and the server node 54. The user node identifies the agent process on the server node 56, which causes generation of an appropriate interrupt on the server node 58. FIG. 3 illustrates that the new communications session can be closed 60 as soon as the agent process has been identified 56, or after the interrupt at the server node has actually been generated 58.

The interrupt at the server node causes an interrupt request flag to be set 62, which is eventually detected by the agent process 64. The agent process then rolls back the currently pending request 66 in order to handle the interrupt gracefully, and signals that the request was interrupted 68 over the original communications link established between the user and server nodes.

The preferred embodiment described above illustrates the use of two separate communications links using half-duplex communications over a network. However, if a particular network supported full-duplex communications, it is possible for the interrupt request signal at the user node to be transmitted to the server node over the existing communications link. Such an interrupt could cause a flag to be raised in a control block 22 as described above, allowing the agent process 18 to gracefully handle the interrupt as describe above.

While the invention has been particularly shown and described with reference to a preferred embodiment, it will be understood by those skilled in the art that various changes in form and detail may be made therein without departing from the spirit and scope of the invention.

We claim:

1. A method for interrupting execution of a process, comprising the steps of:

executing a first process on a local node connected to a network;

establishing a first communications session over the network from the local node to a remote node connected to the network;

executing a second process on the remote node, wherein the first communications session is between the first process and the second process;

generating a signal to the first process on the local node to interrupt execution of the second process;

establishing a second communications session, over the network from the local node to the remote node., between the first process and an interrupt server process;

sending a message, over the second communication session, from the local node to the remote node indicating that the second process is to be interrupted;

on the second node, executing the interrupt server process to receive the message indicating that the second process is to be interrupted; and in response to receiving, at the interrupt server process, the message that the second process is to be interrupted, interrupting execution of the second process.

2. The method of claim 1, wherein the interruption of the second process causes the second process to halt execution.

3. The method of claim 1, further comprising the step of:

in response to the step of interrupting execution of the second process, sending a message from the second process to the first process over the first communications session indicating that the interruption has occurred.

4. The method of claim 1, further comprising the step of:

closing the second communications session after the message indicating that the second process is to be interrupted has been sent.

5. The method of claim 1, further comprising the step of:

closing the second communications session after the interrupt server has received the message that the second process is to be interrupted.

6. The method of claim 1, wherein the step of interrupting execution of the second process comprises the steps of:

setting a flag by the interrupt server indicating that the second process is to be interrupted;

periodically polling the flag during execution of the second process to determine the state of the flag; and in response to a determination that the flag indicates that the second process is to be interrupted, interrupting execution of the second process.

7. The method of claim 1, further comprising the steps of:

providing at the local node a control block for the first process which indicates the identity of the second process and provides information necessary to establish the second communication session; and when the signal is generated at the local node that execution of the second process is to be interrupted, utilizing the information contained in the control block to establish the second communication session.

8. The method of claim 1, wherein the second process is a database server, and wherein the step of interrupting execution of the second process includes the step of:

rolling back execution of the second process to a save point.

9. A system for interrupting execution of a process, comprising:

a network for communicating messages between nodes;

a local node connected to the network;

a remote node connected to the network;

a first process executing on the local node;

a second process executing on the second node;

a first communication session over the network between the first and second processes;

means executing on the local node for indicating that the second process is to be interrupted;

means for establishing a second communication session over the network between the first process and an interrupt server process executing on the remote node; and means within the interrupt server process for interrupting execution of the second process in response to a message transmitted from the local node over the second communication session.

10. The system of claim 9, further comprising:

means for sending a message from the remote node to the local node over the first communication session when execution of the second process is interrupted.

11. The system of claim 9, further comprising:

a control block on the local node for indicating the identity of the second process and providing information necessary to establish the second communication session.

12. The system of claim 9, further comprising:

means for closing the second communication session after the message is transmitted over the second communication session.

13. The system of claim 9, further comprising:

means for closing the second communication session after the execution interrupting means interrupts execution of the second process.

* * * * *